US006466276B1

(12) United States Patent
Makiyama

(10) Patent No.: US 6,466,276 B1
(45) Date of Patent: Oct. 15, 2002

(54) SIGNAL DISTRIBUTING/SYNTHESIZING APPARATUS

(75) Inventor: Joji Makiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/150,935

(22) Filed: Sep. 10, 1998

(30) Foreign Application Priority Data

Sep. 11, 1997 (JP) .......................................... 9-246745

(51) Int. Cl.[7] ......................... H04N 5/268; H04N 5/38; H01P 5/12; H01P 5/22; H01P 1/10; H04B 7/02; H04B 1/02; H04B 1/04; H04Q 7/20

(52) U.S. Cl. ...................... 348/723; 348/705; 333/101; 333/117; 455/101; 455/103; 455/428; 455/451; 455/107

(58) Field of Search ............................... 455/101, 103, 455/451, 428, 19, 107; 348/554, 570, 707, 705, 35, 61; 333/101, 102, 105, 107, 111, 113, 117, 261, 262, 106, 125

(56) References Cited

U.S. PATENT DOCUMENTS 3,800,222 A * 3/1974 Kowalewski ................ 325/23
4,016,503 A * 4/1977 Rambo ....................... 330/124
4,723,307 A * 2/1988 Clark et al.
4,748,423 A 5/1988 Jinich
5,023,575 A * 6/1991 Stojan
5,128,627 A * 7/1992 Wendt ......................... 330/51
5,146,190 A * 9/1992 Firmain ....................... 333/112
5,203,018 A * 4/1993 Hiroso ........................ 455/61
5,258,995 A * 11/1993 Su et al. ......................... 375/1
5,594,394 A * 1/1997 Sasaki et al. ............... 333/101
5,625,894 A * 4/1997 Jou ............................ 455/78
5,822,684 A * 10/1998 Kitakubo ..................... 455/78

FOREIGN PATENT DOCUMENTS

| | | | |
|---|---|---|---|
| DE | 3713086 A1 * | 4/1987 |
| EP | 0622911 A2 * | 4/1994 |
| JP | 57-135528 | 8/1982 |
| JP | 57-159140 | 10/1982 |
| JP | 57-197901 | 12/1982 |
| JP | 60-30642 | 3/1985 |
| JP | 63-31601 | 3/1988 |
| JP | 63-316940 | 12/1988 |
| JP | 1-280901 | 11/1989 |
| JP | 4-29201 | 3/1992 |
| JP | 5-18132 | 3/1993 |
| JP | 6-177781 | 6/1994 |
| JP | 9-36781 | 2/1997 |

* cited by examiner

*Primary Examiner*—John Miller
*Assistant Examiner*—Paulos M. Natnael
(74) *Attorney, Agent, or Firm*—Sughrue Mion, PLLC

(57) ABSTRACT

A signal distributing/synthesizing apparatus includes a 4-terminal hybrid circuit, first and second antennas, a pseudo-antenna, and first to third 4-terminal switches. The 4-terminal hybrid circuit distributes the signal input to the first terminal to the second and third terminals, and synthesizes the signals input to the second and third terminals into a signal to be output to the first terminal. The first and second antennas form a radio transmission channel for an output signal from the signal 4-terminal hybrid circuit. The pseudo-antenna forms a pseudo-radio transmission channel for an output signal from the 4-terminal hybrid circuit. The first switch complementarily switches/connects a first broadcasting unit and the first antenna to the first terminal of the 4-terminal hybrid circuit and the third switch. The second switch complementarily switches/connects a second broadcasting unit and the second antenna to the second terminal of the 4-terminal hybrid circuit and the third switch. The third switch complementarily switches/connects the pseudo-antenna and the third terminal of the 4-terminal hybrid circuit to the first and second switches.

20 Claims, 3 Drawing Sheets

SIGNAL DISTRIBUTING/SYNTHESIZING APPARATUS

BACKGROUND OF THE INVENTION

The present invention relates to an output distributing/synthesizing apparatus in a current/spare operation scheme or parallel operation scheme using TV (Television) and FM (Frequency Modulation) broadcasting units and the like.

FIGS. 4A and 4B show the schematic arrangements of conventional output switching apparatuses. The output switching apparatus shown in FIG. 4A is disclosed in Japanese Patent Laid-Open No. 57-197901. This apparatus is constituted by 4-terminal hybrid circuits 21 and 22 and variable phase shifters 41 and 42 connected between the output terminals of the 4-terminal hybrid circuit 21 and the input terminals of the 4-terminal hybrid circuit 22. The output switching apparatus having this arrangement switches outputs from first and second broadcasting units 26 and 28 to an antenna 27 and a pseudo-antenna 29 without interruption. Reference numeral 43 denotes a quarter-wavelength line for a phase shift of 90°.

FIG. 4B shows an output switching circuit for switching output signals from first and second broadcasting units 26 and 28 to antennas 27*a* and 27*b* without interruption. This circuit differs from that shown in FIG. 4A in that 4-terminal switches 71 to 74 are arranged in twos between the first and second broadcasting units 26 and 28 and a 4-terminal hybrid circuit 21 and between a 4-terminal hybrid circuit 22 and the antennas 27*a* and 27*b*, and the pseudo-antenna is replaced with the antenna.

The first problem posed by the output switching apparatus having the arrangement is that while a program is put on the air in the first broadcasting unit 26, the second broadcasting unit 28 cannot perform maintenance using a test signal and the pseudo-antenna 29.

The reason for this is that since the degree of isolation between the first and second broadcasting units 26 and 28 is only about −40 dB at the antenna output terminal, the test signal from the second broadcasting unit 28 may be superimposed on the signal from the first broadcasting unit 26 while the program is on the air.

The second problem is that in the 2-line feeding system using two antennas, the plurality of 4-terminal switches 71 to 74 are required to independently switch output signals from the first and second broadcasting units 26 and 28 to the antennas 27*a* and 27*b*, as shown in FIG. 4B.

SUMMARY OF THE INVENTION

It is an object of the present invention to provide a distributing/synthesizing apparatus which can attain a reduction in size of a broadcasting system for current/spare operation and parallel operation, a simplification of the circuit arrangement, and an improvement in maintainability.

In order to achieve the above object, according to the present invention, there is provided a signal distributing/synthesizing apparatus comprising signal distributing/synthesizing means for distributing a signal input to a first terminal to second and third terminals, and synthesizing signals input to the second and third terminals into a signal to be output to the first terminal, first and second antennas forming a radio transmission channel for an output signal from the signal distributing/synthesizing means, a pseudo-antenna forming a pseudo-radio transmission channel for an output signal from the signal distributing/synthesizing means, and first, second, and third switching means, wherein the first switching means complementarily switches/connects a first broadcasting unit and the second antenna to the first terminal of the signal distributing/synthesizing means and the third switching means, the second switching means complementarily switches/connects a second broadcasting unit and the second antenna to the second terminal of the signal distributing/synthesizing means and the third switching means, and the third switching means complementarily switches/connects the pseudo-antenna and the third terminal of the signal distributing/synthesizing means to the first and second switching means.

DESCRIPTION OF THE PREFERRED EMBODIMENTS

The present invention will be described in detail below with reference to the accompanying drawings.

Figure 1:
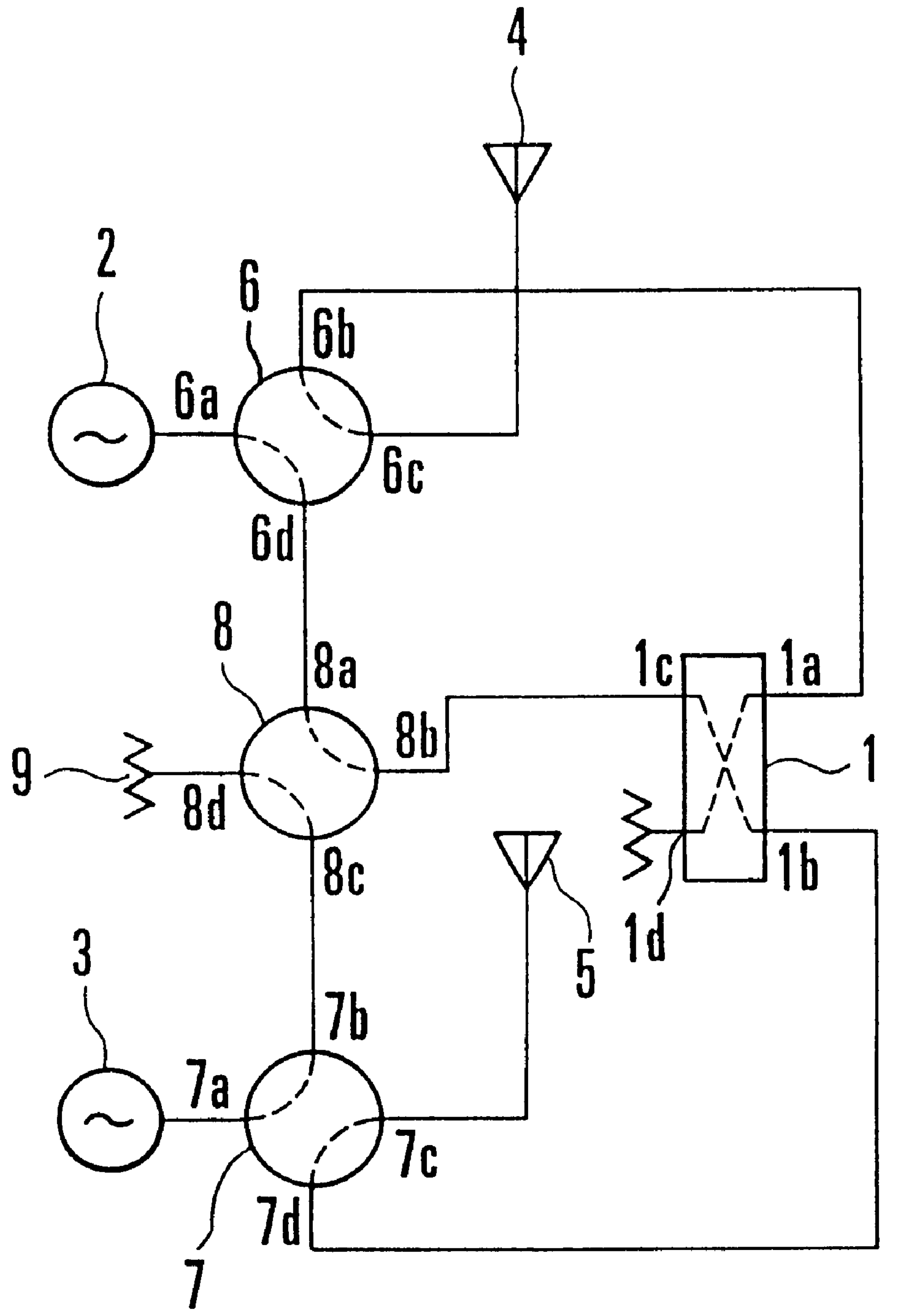
FIG. 1 is a block diagram showing the schematic arrangement of a signal distributing/synthesizing apparatus according to the first embodiment of the present invention.

FIG. 1 shows the schematic arrangement of a distributing/synthesizing apparatus according to the first embodiment of the present invention. Referring to FIG. 1, the distributing/synthesizing apparatus of this embodiment is constituted by a 4-terminal hybrid circuit 1 for distributing/synthesizing the signals selectively input to a plurality of terminals 1*a* to 1*d*, first and second antennas 4 and 5 for forming radio transmission channels for output signals from first and second broadcasting units 2 and 3, first to third 4-terminal switches 6, 7, and 8 each having four terminals interlocked/switched with the adjacent terminals, and a pseudo-antenna 9 for forming pseudo-radio transmission channels for output signals from the first and second broadcasting units 2 and 3.

The 4-terminal switch 6 switches the output signal from the first broadcasting unit 2, which is input to a terminal 6*a*, to the terminal 1*a* of the 4-terminal hybrid circuit 1 and a terminal 8*a* of the 4-terminal switch 8. The 4-terminal switch 7 switches the output signal from the second broadcasting unit 3, which is input to a terminal 7*a*, to the terminal 1*b* of the 4-terminal hybrid circuit 1 and a terminal 8*c* of the 4-terminal switch 8. The 4-terminal switch 8 receives the output signals from the first and second broadcasting units 2 and 3 through the 4-terminal switches 6 and 7, and switches one of the output signals to the pseudo-antenna 9.

In the 4-terminal switch 8, a terminal 8*b* is connected to the terminal 1*c* of the 4-terminal hybrid circuit 1, and a terminal 8*d* is connected to the pseudo-antenna 9. The terminals 6*c* and 7*c* of the 4-terminal switches 6 and 7 are respectively connected to the antennas 4 and 5.

In the distributing/synthesizing apparatus having the above arrangement, an output signal from the first broadcasting unit 2 is input to the terminal 1*c* of the 4-terminal hybrid circuit 1 through the terminal 6*a* and a terminal 6*d* of the 4-terminal switch 6 and the terminals 8*a* and 8*b* of the 4-terminal switch 8. The output signal input to the terminal 1*c* is distributed by the 4-terminal hybrid circuit 1 to be output from the terminals 1*a* and 1*b*. The output signal from the terminal 1*a* of the 4-terminal hybrid circuit 1 is output to the antenna 4 through a terminal 6*b* and the terminal 6*c* of the 4-terminal switch 6. The output signal from the terminal 1*b* of the 4-terminal hybrid circuit 1 is output to the antenna 5 through a terminal 7*d* and the terminal 7*c* of the 4-terminal switch 7.

An output signal from the second broadcasting unit 3 is output to the pseudo-antenna 9 through the terminal 7*a* and a terminal 7*b* of the 4-terminal switch 7 and the terminals 8*c* and 8*d* of the 4-terminal switch 8. In the connected state shown in FIG. 1, therefore, this apparatus operates as a current/spare operation system with the first broadcasting unit 2 serving as a current system and the second broadcasting unit 3 serving as a spare system. In this case, while the first broadcasting unit 2 is broadcasting programs through the antennas 4 and 5, the second broadcasting unit 2 can perform maintenance using the test signal sent to the pseudo-antenna 9.

Referring to FIG. 1, when the contacts 8*a* and 8*d* and the contacts 8*b* and 8*c* of the 4-terminal switch 8 are connected to each other, the second broadcasting unit 3 serves as a current system, and the first broadcasting unit 2 serves as a spare system.

Figure 2A:
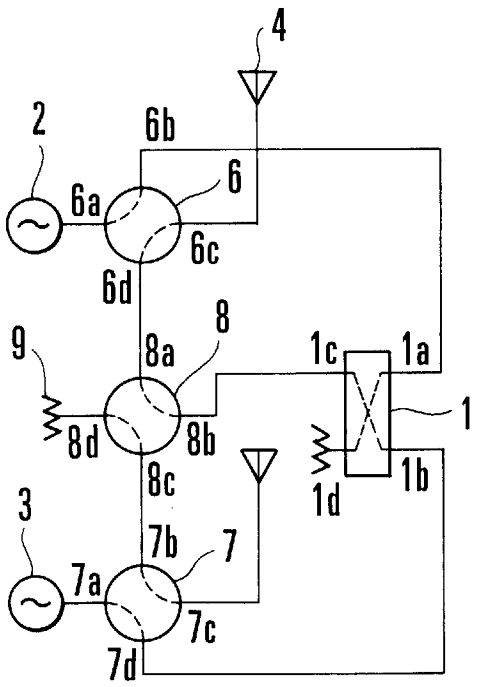
FIG. 2A is a block diagram showing the synthetic operation state of the first and second broadcasting units of the signal distributing/synthesizing unit in FIG. 1.

FIG. 2A shows a synthetic operation state of the first and second broadcasting units 2 and 3 after switching of the 4-terminal switches 6 and 7 in FIG. 1.

As shown in FIG. 2A, when the 4-terminal switches 6 and 7 are switched, the output signal from the first broadcasting unit 2 is guided to the terminal 1*a* of the 4-terminal hybrid circuit 1 through the terminals 6*a* and 6*b* of the 4-terminal switch 6. The output signal from the second broadcasting unit 3 is guided to the terminal 1*b* of the 4-terminal hybrid circuit 1 through the terminals 7*a* and 7*d* of the 4-terminal switch 7. The 4-terminal hybrid circuit 1 synthesizes the two output signals from the terminals la and 1*b*, and outputs the synthetic output signal to the terminal 1*c*. The output signal from the terminal 1*c* of the 4-terminal hybrid circuit 1 is output to the antenna 4 through the terminals 8*b* and 8*a* of the 4-terminal switch 8 and the terminals 6*d* and 6*c* of the 4-terminal switch 6.

In this case, since the antenna power output to the antenna 4 is twice that output from the antennas 4 and 5 in the current/spare operation state shown in FIG. 2A, a reduction in broadcast service area provided by the signal antenna 4 can be minimized.

Referring to FIG. 2A, synthetic operation can also be performed by using the antenna 5 instead of the antenna 4 by connecting the contacts 8*a* and 8*d* and the contacts 8*b* and 8*c* of the 4-terminal switch 8 to each other.

Figure 2B:
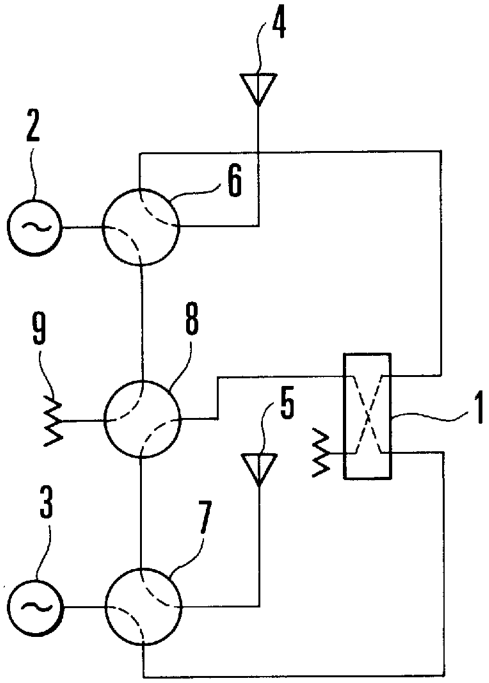
FIG. 2B is a block diagram showing the current/spare operation state in which the second broadcasting unit uses only the second antenna.

As shown in FIG. 2B, when the 4-terminal switches 7 and 8 are switched from the state shown in FIG. 1, maintenance for the antenna 4 can be performed by switching the output signal from the second broadcasting unit 3 to only the antenna 5. Note that the output signal from the first broadcasting unit 2 can be switched to only the antenna 4 to perform maintenance for the antenna 5.

Figure 3A:
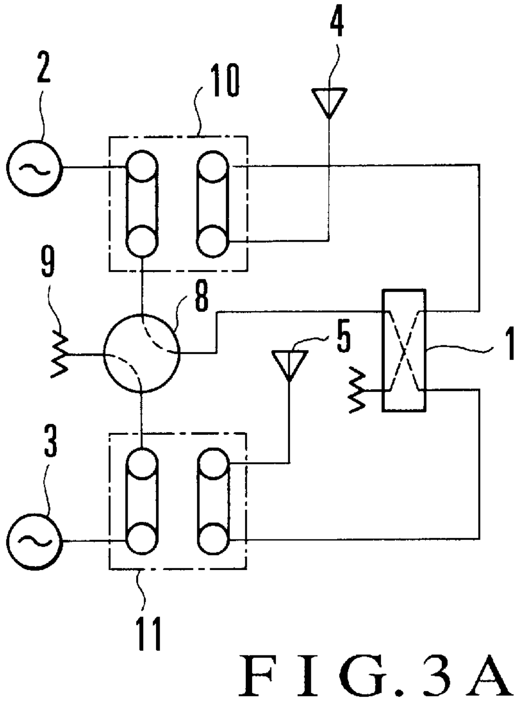
FIG. 3A is a block diagram showing the current/spare operation state of the signal distributing/synthesizing unit according to the second embodiment of the present invention.

FIG. 3A shows the schematic arrangement of a distributing/synthesizing apparatus according to the second embodiment of the present invention. The second embodiment differs from the first embodiment in that two link couplers 10 and 11 are used in place of the 4-terminal switches 6 and 7 in FIG. 1. In the arrangement shown in FIG. 3A, similar to the first embodiment, in the current/spare operation state, an output signal from a first broadcasting unit 2 is connected to a 4-terminal hybrid circuit 1 through the U link coupler 10 and a 4-terminal switch 8. An output signal from a second broadcasting unit 3 is connected to a pseudo-antenna 9 through the 4-terminal switch 8.

Figure 3B:
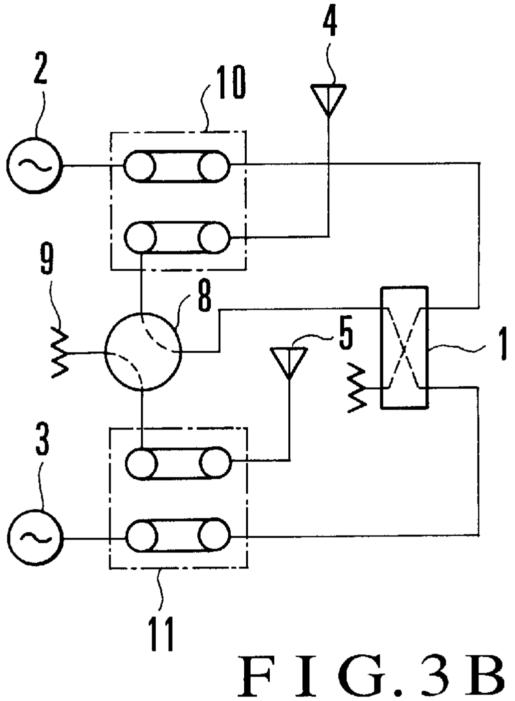
FIG. 3B is a block diagram showing the synthetic operation state of the signal distributing/synthesizing unit in FIG. 3A.
Figure 4A:
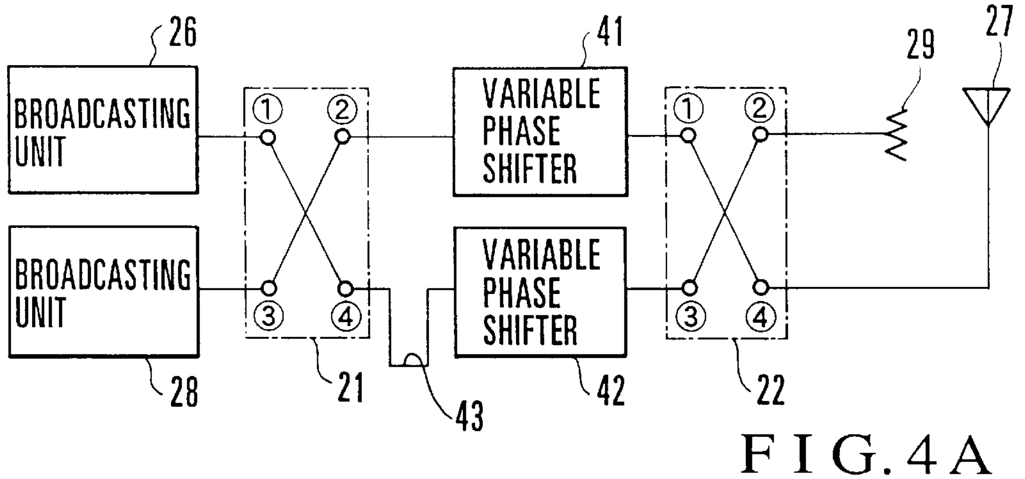
FIG. 4A PRIOR ART
FIGS. 4A and 4B are block diagrams showing the schematic arrangements of conventional output switching apparatuses.
Figure 4B:
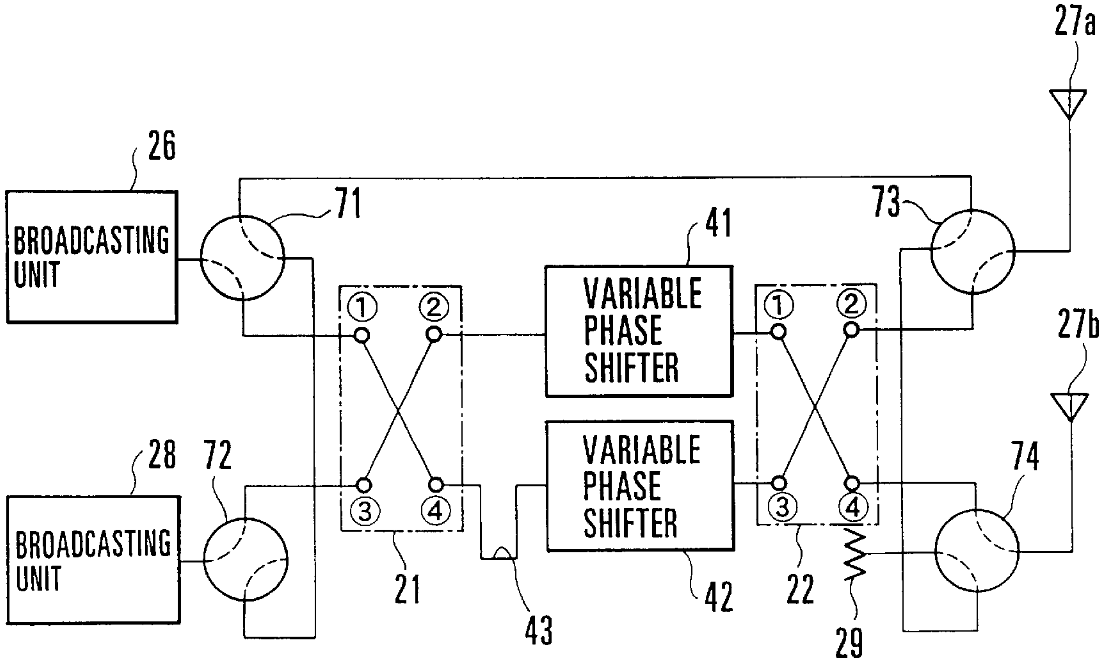
FIG. 4B PRIOR ART

As shown in FIG. 3B, by switching the two U link couplers 10 and 11, the output signals from the first and second broadcasting units 2 and 3 are synthesized and output to an antenna 4.

In the first and second embodiments, the 4-terminal hybrid circuit 1 is used. However, the present invention is not limited to the 4-terminal hybrid circuit 1. Obviously, a 3-terminal distribution/synthesis unit (e.g., a Wilkinson type 2-distribution/2-synthesis unit) having a similar function can be used.

As has been described above, according to the present invention, the following effects can be obtained.

The first effect is that in the current/spare operation state, since a program from the first broadcasting unit can be broadcast from the two antennas, sufficient antenna redundancy can be ensured, and maintenance for the second broadcasting unit can be performed by using the pseudo-antenna. This is because, a high degree of isolation can be ensured between the first and second broadcasting units by the 4-terminal switches.

The second effect is that when maintenance is required for one antenna because of a failure, output powers from the first and second broadcasting units can be synthesized and broadcast to the other antenna, and hence a reduction in service area can be minimized. This is because, the 4-terminal hybrid circuit is used as a signal synthesizer.

What is claimed is:

1. A signal distributing/synthesizing apparatus comprising:

signal distributing/synthesizing means for distributing a signal input to at least one of a first, a second, and a third terminal of said signal distributing/synthesizing means and synthesizing said signals input to the second and the third terminals into a signal to be output to the first terminal;

first and second antennas forming a radio transmission channel for an output signal from said signal distributing/synthesizing means;

a pseudo-antenna forming a pseudo-radio transmission channel for an output signal from said signal distributing/synthesizing means; and first, second, and third switching means, wherein said first switching means complementarily switches/connects a first broadcasting unit and said first antenna to the first terminal of said signal distributing/synthesizing means and said third switching means, said second switching means complementarily switches/connects a second broadcasting unit and said second antenna to the second terminal of said signal distributing/synthesizing means and said third switching means, and said third switching means complementarily switches/connects said pseudo-antenna and the third terminal of said signal distributing/synthesizing means to said first and second switching means.

2. An apparatus according to claim 1, wherein said first switching means includes a first terminal connected to said first broadcasting unit, a second terminal connected to the first terminal of said signal distributing/synthesizing means, a third terminal connected to said first antenna, and a fourth terminal connected to said third switching means, said second switching means includes a first terminal connected to said second broadcasting unit, a second terminal connected to said third switching means, a third terminal connected to said first antenna, and a fourth terminal connected to the second terminal of said signal distributing/synthesizing means, and said third switching means includes a first terminal connected to the fourth terminal of said first switching means, a second terminal connected to the third terminal of said signal distributing/synthesizing means, a third terminal connected to the second terminal of said second switching means, and a fourth terminal connected to the second terminal of said signal distributing/synthesizing means.

3. An apparatus according to claim 2, wherein in a current/spare operation, first and fourth contacts and second and third contacts of said first switching means are connected to each other, first and second contacts and third and fourth contacts of said second switching means are connected to each other, and a fourth contact of said third switching means is connected to one of first and third contacts, and a second contact is connected to the other of the first and third contacts.

4. An apparatus according to claim 2, wherein in a current/spare operation, either first and fourth contacts and first and fourth contacts of said first and second switching means or first and second contacts and third and fourth contacts of said first and second switching means are connected to each other, and either first and fourth contacts and second and third contacts of said third switching means or first and second contacts and third and fourth contacts of said third switching means are connected to each other.

5. An apparatus according to claim 2, wherein in synthetic operation of said first and second broadcasting units, first and second contacts and third and fourth contacts of said first switching means are connected to each other, first and fourth contacts and second and third contacts of said second switching means are connected to each other, and a fourth contact of said third switching means is connected to one of first and third contacts, and a second contact of said third switching means is connected to the other of the first and third contacts.

6. An apparatus according to claim 1, wherein said switching means comprises a 4-terminal switch.

7. An apparatus according to claim 1, wherein said switching means comprises a U link switch.

8. An apparatus according to claim 1, wherein said signal distributing/synthesizing means comprises a 4-terminal hybrid circuit.

9. An apparatus according to claim 1, wherein said signal distributing/synthesizing means comprises a 3-terminal distributing/synthesizing unit.

10. An apparatus according to claim 1, wherein said signal distributing/synthesizing means comprises a 4-terminal hybrid circuit, and said signal distributing/synthesizing means comprises a 3-terminal distributing/synthesizing unit.

11. A signal distributing/synthesizing apparatus comprising:

signal distributing/synthesizing circuit for distributing a signal input to at least one of a first, a second, and a third terminal of said signal distributing/synthesizing circuit and synthesizing said signals input to the second and the third terminals into a signal to be output to the first terminal;

first and second antennas forming a radio transmission channel for an output signal from said signal distributing/synthesizing circuit;

a pseudo-antenna forming a pseudo-radio transmission channel for an output signal from said signal distributing/synthesizing circuit; and first, second, and third switches, wherein said first switch complementarily switches/connects a first broadcasting unit and said first antenna to the first terminal of said signal distributing/synthesizing circuit and said third switch, said second switch complementarily switches/connects a second broadcasting unit and said second antenna to the second terminal of said signal distributing/synthesizing circuit and said third switch, and said third switch complementarily switches/connects said pseudo-antenna and the third terminal of said signal distributing/synthesizing circuit to said first and second switches.

12. An apparatus according to claim 11, wherein said first switch includes a first terminal connected to said first broadcasting unit, a second terminal connected to the first terminal of said signal distributing/synthesizing circuit, a third terminal connected to said first antenna, and a fourth terminal connected to said third switch, said second switch includes a first terminal connected to said second broadcasting unit, a second terminal connected to said third switch, a third terminal connected to said first antenna, and a fourth terminal connected to the second terminal of said signal distributing/synthesizing circuit, and said third switch includes a first terminal connected to the fourth terminal of said first switch, a second terminal connected to the third terminal of said signal distributing/synthesizing circuit, a third terminal connected to the second terminal of said second switch, and a fourth terminal connected to the second terminal of said signal distributing/synthesizing circuit.

13. An apparatus according to claim 12, wherein in a current/spare operation, first and fourth contacts and second and third contacts of said first switch are connected to each other, first and second contacts and third and fourth contacts of said second switch are connected to each other, and a fourth contact of said third switch is connected to one of first and third contacts, and a second contact is connected to the other of the first and third contacts.

14. An apparatus according to claim 12, wherein in a current/spare operation, either first and fourth contacts and first and fourth contacts of said first and second switches or first and second contacts and third and fourth contacts of said first and second switches are connected to each other, and either first and fourth contacts and second and third contacts of said third switch or first and second contacts and third and fourth contacts of said third switch are connected to each other.

15. An apparatus according to claim 12, wherein in synthetic operation of said first and second broadcasting units, first and second contacts and third and fourth contacts of said first switch are connected to each other, first and fourth contacts and second and third contacts of said second switch are connected to each other, and a fourth contact of said third switch is connected to one of first and third contacts, and a second contact of said third switch is connected to the other of the first and third contacts.

16. An apparatus according to claim 11, wherein said switches comprise a 4-terminal switch.

17. An apparatus according to claim 11, wherein said switches comprises a U link switch.

18. An apparatus according to claim 11, wherein said signal distributing/synthesizing circuit comprises a 4-terminal hybrid circuit.

19. An apparatus according to claim 11, wherein said signal distributing/synthesizing circuit comprises a 3-terminal distributing/synthesizing unit.

20. An apparatus according to claim 11, wherein said signal distributing/synthesizing circuit comprises a 4-terminal hybrid circuit, and said signal distributing/synthesizing circuit comprises a 3-terminal distributing/synthesizing unit.

* * * * *